US010540980B2

(12) United States Patent
Zheng et al.

(10) Patent No.: US 10,540,980 B2
(45) Date of Patent: Jan. 21, 2020

(54) DYNAMIC SECURITY CODE SPEECH-BASED IDENTITY AUTHENTICATION SYSTEM AND METHOD HAVING SELF-LEARNING FUNCTION

(71) Applicant: BEIJING D-EAR TECHNOLOGIES CO., LTD., Beijing (CN)

(72) Inventors: Fang Zheng, Beijing (CN); Xiaojun Wu, Beijing (CN); Lantian Li, Beijing (CN); Gang Wang, Beijing (CN); Xiaogang Wang, Beijing (CN); Le Liu, Beijing (CN)

(73) Assignee: BEIJING D-EAR TECHNOLOGIES CO., LTD., Beijing (CN)

( * ) Notice: Subject to any disclaimer, the term of this patent is extended or adjusted under 35 U.S.C. 154(b) by 82 days.

(21) Appl. No.: 15/542,428

(22) PCT Filed: Jul. 8, 2015

(86) PCT No.: PCT/CN2015/083540
§ 371 (c)(1),
(2) Date: Jul. 9, 2017

(87) PCT Pub. No.: WO2016/123900
PCT Pub. Date: Aug. 11, 2016

(65) Prior Publication Data
US 2017/0365259 A1 Dec. 21, 2017

(30) Foreign Application Priority Data
Feb. 5, 2015 (CN) .......................... 2015 1 0061721

(51) Int. Cl.
*G10L 15/00* (2013.01)
*G10L 15/06* (2013.01)
(Continued)

(52) U.S. Cl.
CPC .............. *G10L 17/24* (2013.01); *G10L 15/30* (2013.01); *G10L 17/02* (2013.01); *G10L 17/04* (2013.01);
(Continued)

(58) Field of Classification Search
CPC ......... G06Q 20/40145; G06Q 20/3821; G06Q 20/4014; G10L 17/22; G10L 17/26;
(Continued)

(56) References Cited

U.S. PATENT DOCUMENTS

| 5,687,287 A | 11/1997 | Gandhi et al. |
| 8,694,315 B1 * | 4/2014 | Sheets .............. G06Q 20/40145 |
| | | 704/246 |

(Continued)

FOREIGN PATENT DOCUMENTS

| CA | 2173302 | 11/1996 |
| CN | 1302427 | 7/2001 |

(Continued)

OTHER PUBLICATIONS

J. Richiardi, P. Prodanov and A. Drygajlo, "Speaker Verification with Confidence and Reliability Measures," 2006 IEEE International Conference on Acoustics Speech and Signal Processing Proceedings, Toulouse, 2006, pp. I-I. doi: 10.1109/ICASSP.2006.1660102.*

*Primary Examiner* — Michael Ortiz-Sanchez
(74) *Attorney, Agent, or Firm* — JMB Davis Ben-David

(57) ABSTRACT

Dynamic security code speech-based identity authentication system and method having self-learning function, being equipped with: a time-varying data storage unit for storing speech data of each user with time labels; a time-varying data update module (23) for storing the latest speech data into the time-varying data storage unit; a time window channel construction module (24) for extracting speech data (Continued)

from the time-varying data storage unit in the order of the time labels, constructing and updating the time window channel comprising multiple sets of speech data; a voiceprint model reconstruction module (25) reconstructing the user voiceprint model by using the multiple sets of speech data comprised in the updated time window channel.

14 Claims, 10 Drawing Sheets

(51) Int. Cl.

| | |
|---|---|
| *G10L 17/24* | (2013.01) |
| *G10L 17/04* | (2013.01) |
| *G10L 15/30* | (2013.01) |
| *G10L 17/02* | (2013.01) |
| *G10L 17/06* | (2013.01) |
| *G10L 25/24* | (2013.01) |
| *H04L 29/06* | (2006.01) |
| *H04W 12/06* | (2009.01) |

(52) U.S. Cl.
CPC .............. *G10L 17/06* (2013.01); *G10L 25/24* (2013.01); *H04L 63/083* (2013.01); *H04L 63/0861* (2013.01); *H04W 12/06* (2013.01)

(58) Field of Classification Search
CPC ......... G10L 17/00; G10L 17/04; G10L 17/24; G10L 17/005; G10L 17/10; G10L 15/06; G10L 15/30; G06F 21/32; G06F 2221/2117; G06F 3/167; G06F 21/46; H04M 3/382; H04Q 2213/13515; H04L 63/0861; H04L 9/32; H04L 9/3231; H04L 2463/102; H04L 63/083
See application file for complete search history.

(56) References Cited

U.S. PATENT DOCUMENTS

| | | | |
|---|---|---|---|
| 9,571,490 B2* | 2/2017 | Fu | .......... H04L 63/083 |
| 10,074,089 B1* | 9/2018 | Rangaraj | .......... G06Q 20/40145 |
| 2004/0046641 A1* | 3/2004 | Junqua | .............. G07C 9/00158 340/5.82 |
| 2004/0162726 A1* | 8/2004 | Chang | .................... G10L 17/22 704/247 |
| 2005/0167482 A1* | 8/2005 | Ramachandran | ...... G06Q 20/10 235/379 |
| 2014/0133710 A1* | 5/2014 | Hama | ................ G06K 9/00087 382/115 |
| 2014/0172430 A1* | 6/2014 | Rutherford | ............ G06Q 20/20 704/273 |
| 2014/0250517 A1* | 9/2014 | Kim | ...................... H04L 9/3228 726/7 |
| 2014/0379342 A1* | 12/2014 | Li | .................... G06Q 20/40145 704/246 |
| 2015/0220715 A1* | 8/2015 | Kim | ........................ G06F 21/32 726/18 |
| 2015/0301796 A1* | 10/2015 | Visser | .................... G06F 3/167 715/728 |
| 2018/0137865 A1* | 5/2018 | Ling | .................... G10L 15/08 |

FOREIGN PATENT DOCUMENTS

| | | | |
|---|---|---|---|
| CN | 101197131 | 6/2008 | |
| CN | 102024455 | 4/2011 | |
| CN | 102238189 | 11/2011 | |
| CN | 102404287 | 4/2012 | |
| CN | 102760434 | 10/2012 | |
| CN | 103632667 | 3/2014 | |
| CN | 104616655 | 5/2015 | |
| WO | WO-2014190742 A1 * | 12/2014 | ............ H04L 29/06 |

\* cited by examiner

DYNAMIC SECURITY CODE SPEECH-BASED IDENTITY AUTHENTICATION SYSTEM AND METHOD HAVING SELF-LEARNING FUNCTION

CROSS-REFERENCE TO RELATED APPLICATIONS

This is the U.S. National Stage of International Application No. PCT/CN2015/083540 filed Jul. 8, 2015, which was published in Chinese under PCT Article 21(2), and which in turn claims the benefit of China Patent Application No. 201510061721.8 filed Feb. 5, 2015.

TECHNICAL FIELD

The present invention relates to a dynamic security code speech-based identity authentication system and method having self-learning function, which belong to the technical field of computer and information service.

BACKGROUND ART

Speaker recognition technology, also known as voiceprint recognition technology, is mainly based on the information contained in the speech, which information can characterize the personal characteristic of the speaker, and automatically implements the authentication of the identity of the speaker by using computers and a variety of information recognition technologies.

In recent years, with the rapid development of the Internet and the widespread popularity of the mobile terminal equipment, the fast and convenient mobile network service has deeply affected and changed the lifestyle of human beings. In order to securely and reliably carry out the mobile network service, the first problem to be solved is how to implement user identity authentication.

The research on application of the speaker recognition system on user identity authentication has been carried out for several years. A voiceprint model is built from a series of feature parameters which are contained in speech and can uniquely characterize the speaker's identity. FIG. 15 shows a framework of a typical speaker recognition system.

Speech is a non-contact information carrier, and people collect speech at anytime and anywhere by means of a variety of mobile terminal devices (such as mobile phone microphones, IP phones, etc.). According to the voiceprint information in the speech, human-computer interaction and identity recognition are achieved through network transmission and background server response. Therefore, in recent years, speaker recognition technology has been rapidly developed, and is widely used in the real environment.

The existing biometric recognition technologies achieve recognition and authentication usually by using the template matching method in the field of pattern recognition, that is, a model reserved by a user is compared with the actual model to be authenticated, and if the similarity of the two models reaches a preset threshold, the authentication passes, otherwise the authentication fails.

SUMMARY

Technical problem solved by the present invention
In the single model matching scheme described above, there are two technical problems as follows.
(1) For the speaker recognition technology, if the texts of the training speech and the testing speech provided by the user are unique, the recognition efficiency is higher. However, in this case, when the speech of the user is stolen or embezzled, the system security will become lower. Conversely, if the text of the testing speech provided by the user is not fixed, the system security will be improved. However, in this case, due to the difference in the text phoneme space between the training speech and the text varied speech, the recognition performance of the system will be greatly reduced, which is not conducive to the application and promotion of the system.
(2) The vocal tract model and pronunciation characteristic of human beings, and the accuracy and fidelity of the recording device will change as time goes on. From a physiological perspective, the physiological characteristics and pronunciation characteristics of human beings will continuously change as time goes on. For example, the vocal tract length, pitch frequency, etc. will continuously change as time goes on. In addition, after long-term use, communication equipments and mobile terminals for recording will suffer from equipment aging, signal instability, or the like, which may also affect the accuracy and fidelity of the recording. Based on the above, these uncertainties due to time changes make it impossible for us to obtain a stable and robust voiceprint model. Obviously, the recognition accuracy of the system will continuously decrease as time goes on.

The present invention has been made in view of the above technical problems, and it is an object of the present invention to provide a dynamic security code speech-based identity authentication system and method having self-learning function, thereby effectively solving the above-described technical problems.

Solution to the Technical Problem

The present invention provides a dynamic security code speech-based identity authentication system having self-learning function, comprising: a request receiving module for receiving an identity authentication request that a requester sends to a server through a client; a dynamic security code generating module for generating a dynamic security code and sending the dynamic security code to the client; an identity authentication module for calculating a comprehensive confidence of an identity of the requester by using an acoustic model of the global characters and a voiceprint model of a user based on a security code speech signal sent from the client, wherein the security code speech signal is generated when the requester reads out the dynamic security code, judging the identity of the requester based on the calculated comprehensive confidence of the identity, and feeding an identity authentication result back to the client, wherein, the identity authentication system is provided with an automatic reconstruction subsystem for the voiceprint model, the voiceprint model of the user is reconstructed by the automatic reconstruction subsystem for the voiceprint model when the identity authentication result is that the requester is the user of the server, and the automatic reconstruction subsystem for the voiceprint model comprises: a time-varying data storage unit for storing speech data of each user with time labels; a time-varying data updating module for storing the security code speech signal as the latest speech data into the time-varying data storage unit; a time window channel construction module for extracting speech data of the user from the time-varying data storage unit in the order of the time labels, constructing a time window channel including a plurality of sets of speech data, and updating the speech data included in the time window channel using the latest speech data; and a voiceprint model reconstruction module for reconstructing the voiceprint model of the user for the user using the plurality of sets of speech data included in the updated time window channel.

The present invention also provides a dynamic security code speech-based identity authentication method having self-learning function, comprising following steps: a request receiving step for receiving an identity authentication request that a requester sends to a server through a client; a dynamic security code generating step for generating a dynamic security code and sending the dynamic security code to the client; an identity authentication step for calculating a comprehensive confidence of an identity of the requester by using an acoustic model of the global characters and a voiceprint model of a user based on a security code speech signal sent from the client, wherein the security code speech signal is generated when the requester reads out the dynamic security code, judging the identity of the requester based on the calculated comprehensive confidence of the identity, and feeding an identity authentication result back to the client, wherein, when the identity authentication result is that the requester is the user of the server, the following steps are further performed: a time-varying data storing step for storing the security code speech signal as the latest speech data into a time-varying data storage unit in which speech data of each user is stored with time labels; a time window channel construction step for extracting speech data of the user from the time-varying data storage unit in the order of the time labels, constructing a time window channel including a plurality of sets of speech data, and updating the speech data included in the time window channel using the latest speech data; and a model reconstruction step for reconstructing the voiceprint model of the user for the user using the plurality of sets of speech data included in the updated time window channel According to the present invention, it is possible to provide a secure and reliable identity authentication system and method for dual authentication, and to effectively improve the accuracy of identity authentication and to have self-learning function.

DESCRIPTION OF REFERENCE NUMERALS

Figure 1:
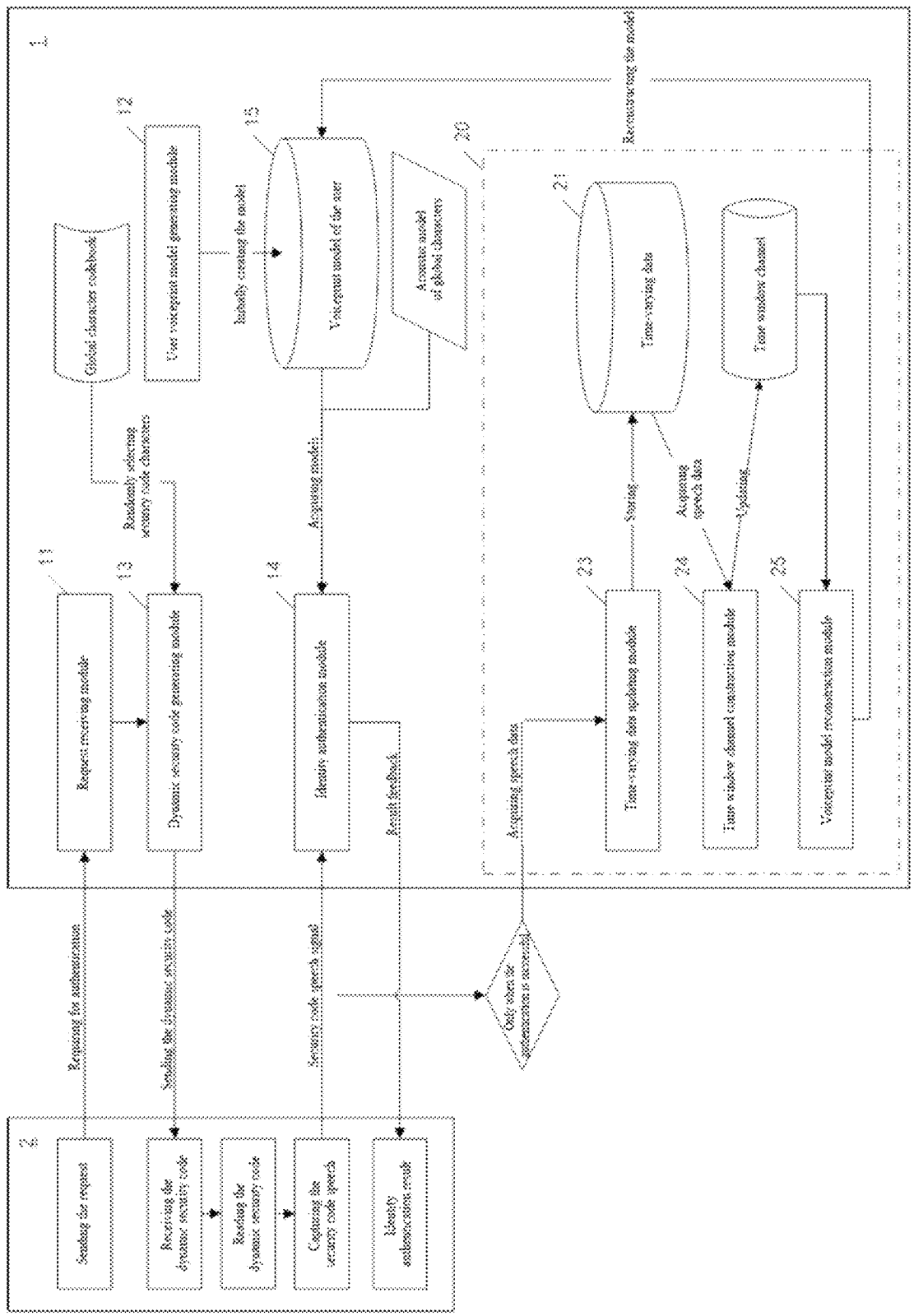
FIG. 1 is a schematic diagram of a dynamic security code speech-based identity authentication system having self-learning function according to the first embodiment.

1, 10, 100: dynamic security code speech-based identity authentication system having self-learning function

11: request receiving module 12: user voiceprint model generating module

13: dynamic security code generating module 14: identity authentication module

15: voiceprint model storage unit 20, 200, 400: automatic reconstruction subsystem for the voiceprint model

21, 210: time-varying data storage unit 22: parameterization module for speech data 23: time-varying data updating module 24, 240: time window channel construction module

25: voiceprint model reconstruction module 260: speech recognition module

DETAILED DESCRIPTION OF EMBODIMENTS

Hereinafter, particular embodiments of the present invention will be described with reference to the drawings.

[First Embodiment]

FIG. 1 is a schematic diagram of a dynamic security code speech-based identity authentication system 1 having self-learning function (hereinafter referred to as "identity authentication system 1") according to the first embodiment. The identity authentication system 1 includes a request receiving module 11, a user voiceprint model generating module 12, a dynamic security code generating module 13, an identity authentication module 14 and a voiceprint model storage unit 15, and has an automatic reconstruction subsystem 20 for the voiceprint model.

The request receiving module 11 is used for receiving the identity authentication request sent by a requester to a server via a client 2. The request receiving module 11 establishes the interaction between the requester and the identity authentication system 1, so that the identity authentication system 1 can respond to the identity authentication request sent by the requester, and provide the foundation for the subsequent processing. The interaction between the requester and the identity authentication system 1 can be used either locally or remotely. The client 2 may be connected to the identity authentication system 1 in a wired or wireless manner. In a practical application, for example, the user inputs information such as a user name, a login password, etc., at the client 2 in advance, thereby completing the login or register. After the user successfully logs in, the user can interact with the identity authentication system 1 to carry out the voiceprint enrollment or the voiceprint identity authentication.

When the user logs in for the first time, the identity authentication system 1 requires the user to reserve a modeling speech, which is used for constructing a voiceprint model of the user. Preferably, when the user is requested to reserve the modeling speech, the identity authentication system 1 transmits a specified character set to the client 2, the user reads all of the characters included in the specified character set. At this point, the client 2 captures the speech of the user and sends the captured speech, i.e., the modeling speech reserved by the user, to the identity authentication system 1. The user voiceprint model generating module 12 creates the voiceprint model of the user for the user based on the received modeling speech which is reserved by the user, and stores the voiceprint model of the user for the user into the voiceprint model storage unit 15. The user voiceprint model generating module 12 may train the voiceprint model of the user by using an acoustic model of the global characters in a self-adaptive manner based on the modeling speech reserved by the user.

The acoustic model of the global characters is obtained by using a method such as Gaussian Mixture Model (GMM), Support Vector Machine (SVM), Artificial Neural Network (ANN), etc., in a self-adaptive training manner based on several people's character pronunciation of each character in the specified character set. The self-adaptation may be achieved by, for example, the maximum likelihood linear regression (MLLR) algorithm or the maximum a posteriori (MAP) algorithm.

It is preferable that the phonemes of the characters included in the specified character set are equally distributed in the character-based phoneme space, so that the accuracy of the voiceprint model of the user can be effectively improved.

The voiceprint model storage unit 15 is used for storing the voiceprint model of each user. In the voiceprint model storage unit 15, the voiceprint model of each user is stored in such a manner that the user (user ID) is associated with the voiceprint model of the user. The voiceprint model storage unit 15 is, for example, a database, but is not limited to a database, as long as it can store the voiceprint model of each user in such a manner that the user is associated with the voiceprint model of the user, and other data storage forms may be used as well.

After the request receiving module 11 receives the identity authentication request sent by the requester via the client 2, the dynamic security code generating module 13 generates a dynamic security code and sends the dynamic security code to the client 2. The generation of the dynamic security code can be achieved using known security code generation techniques.

Figure 2:
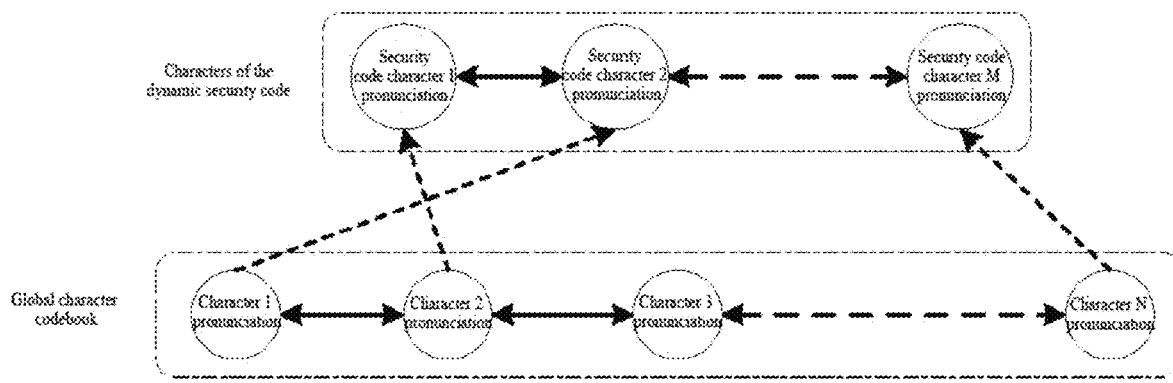
FIG. 2 is a diagram explaining a process for generating a dynamic security code.

For example, a global character codebook may be pre-set in the identity authentication system 1, and the global character codebook may include, for example, English letters, Arabic numerals, and the like. As shown in FIG. 2, in the global character codebook, the dynamic security code acoustic model of the characters 1 to N is stored in a manner that the character is associated with the character pronunciation. When generating the dynamic security code, the dynamic security code generating module 13 randomly selects security code characters 1 to M (M is less than or equal to N) from the global character codebook, and uses the security code characters 1 to M to constitute the dynamic security code. At this time, the security code characters 1 to M selected randomly are not limited to different characters. As the security code characters are randomly selected, in the security code characters 1 to M selected randomly, the same security code character may appear one or more times, it is possible to generate a dynamic security code such as "1313" with the same security code character appeared more than one time, and it is also possible to generate a dynamic security code such as "1234" with the same security code character appeared only once. The present invention is not particularly limited thereto, as long as the security code character used for generating dynamic security code are randomly selected.

After generating the dynamic security code, the dynamic security code generating module 13 sends the dynamic security code to the client 2. The dynamic security code generating module 13 may send the dynamic security code to the client 2 in the form of text, picture, video, audio or encrypted binary data or the like. After the client 2 receives the dynamic security code, the client 2 displays or plays the dynamic security code through output devices, such as, the display screen or loudspeaker of the client 2, and the requester reads out the dynamic security code displayed or played. At this time, the client 2 captures the security code speech signal when the requester reads out the dynamic security code, and sends the security code speech signal to the identity authentication system 1. Not only the characters, but also the character pronunciation corresponding to each character is stored in the global character codebook. Thus, in the present invention, in addition to being able to display a dynamic security code in a visualized manner such as text, picture, video, etc., it is also possible to generate an audio corresponding to the dynamic security code by the dynamic security code generating module 13 based on the character pronunciation stored in the global character codebook, and to transmit the dynamic security code to the client 2 in an audio form. At this time, the client 2 can output the received dynamic security code to the requester by playing the audio.

The identity authentication module 14 calculates the comprehensive confidence CL of the identity based on the security code speech signal, which is transmitted from the client 2, by using the acoustic model of the global characters and the voiceprint model of the user, judges the identity of the requester according to the calculated comprehensive confidence CL of the identity, and transmits the identity authentication result back to the client 2.

The comprehensive confidence CL of the identity in the present invention incorporates the security code content confidence average $\overline{CL_1}$ as well as the requester identity speech confidence average $\overline{CL_2}$. Thus, a system and method for double identity authentication that can not only verify the dynamic security code content, but also verify the speaker's voiceprint are provided.

The identity authentication module 14 extracts the voiceprint model of the user from the voiceprint model storage unit 15, and divides the received security code speech signal into n frames of speech data $x_i$, wherein i=1, 2, . . . , n, and n is a positive integer greater than one.

Next, each frame of speech data $x_i$ is tested on the voiceprint model of the user respectively (the test here can be implemented by using the Viterbi algorithm), thereby obtaining the security code content confidences $CL_1(i)$, i=1, 2, . . . , n. Then, the security code content confidences $CL_1(i)$ of the speech data of all frames are averaged according to Equation 1) to obtain the security code content confidence average $\overline{CL_1}$. Of course, it is also possible to use a known prior art to calculate the security code content confidence, and the present invention is not particularly limited thereto.

$$\overline{CL_1} = \frac{\sum_{i=1}^{n} CL_1(i)}{n} \qquad 1)$$

In addition, for each frame of speech data $x_i$, the likelihood calculation is performed on the voiceprint model of the user and the acoustic model of the global characters respectively, and then the difference between the values of the likelihood functions is calculated according to Equation 2), thereby obtaining the requester identity speech confidences $CL_2(i)$, i=1, 2, . . . , n. Then, the requester identity speech confidences $CL_2(i)$ of the speech data of all frames are averaged according to Equation 3) to obtain the requester identity speech confidence average $\overline{CL_2}$.

$$CL_2(i) = \log p(x_i | \mu_p, \delta_p) - \log p(x_i | \mu_{oa}, \delta_{oa}) \quad 2)$$

$$\overline{CL_2} = \frac{\sum_{i=1}^{n} CL_2(i)}{n} \quad 3)$$

In Equation 2), $\mu_p$ and $\delta_p$ are the average and variance parameters for the voiceprint model of the user respectively, $\mu_{oa}$ and $\delta_{oa}$ are the average and variance parameters of the acoustic model of the global characters respectively, and log p (·) is a likelihood function.

Next, the identity authentication module 14 calculates the comprehensive confidence CL of the identity according to the following Equation 4).

$$CL = \frac{1}{1 + e^{-(\overline{CL_1} + \alpha \cdot \overline{CL_2})}} \quad 4)$$

In Equation 4), $\alpha$ is an adjusting parameter of the security code content confidence average $\overline{CL_1}$ and the requester identity speech confidence average $\overline{CL_2}$, and $\alpha$ is a real number. In the present invention, the comprehensive confidence CL of the identity is normalized to the range of [0, 1] through Equation 4), and the judgment is facilitated.

Then, the identity authentication module 14 judges whether or not the calculated comprehensive confidence CL of the identity is greater than or equal to the preset confidence threshold. If the comprehensive confidence CL of the identity is greater than or equal to the preset confidence threshold, the identity authentication result is that the requester is the user of the server, the identity authentication result is sent back to the client 2, and the requester is allowed to access the server to operate. Conversely, the identity authentication result is that the requester is not the user of the server, the identity authentication result is sent back to the client 2, and the requester is refused to access the server to operate.

In the present invention, the security code content confidence average $\overline{CL_1}$ is used for verifying whether the security code read by the requester is consistent with the dynamic security code sent by the identity authentication system 1, and the requester identity speech confidence average $\overline{CL_2}$ is used for verifying whether the speech spoke by the requester is consistent with the voiceprint model of the user stored in the identity authentication system 1. Thus, a technical scheme for double identity authentication that can not only verify the dynamic security code content but also verify the speaker's voiceprint is provided in the present invention.

Figure 3:
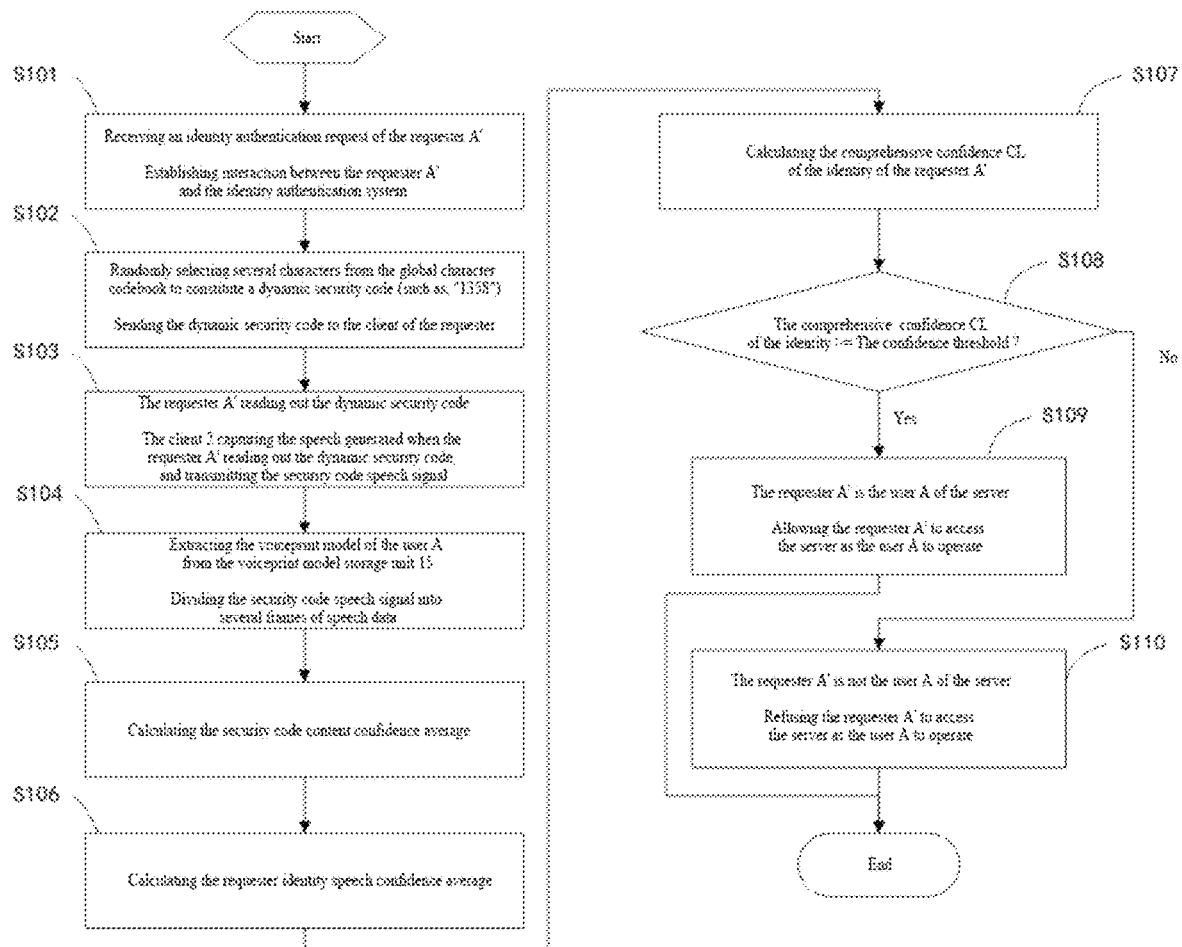
FIG. 3 is a flowchart showing a flow of the identity authentication processing based on the dynamic security code speech.

Referring to FIG. 3, a processing flow performed by the identity authentication system 1 during the above-described identity authentication process will be illustrated. In the example shown in FIG. 3, it is assumed that ten numbers including 0 to 9 constitute the global character codebook.

Step S101: the requester A' completes the login by inputting the correct user ID and login password, and the request receiving module 11 receives the identity authentication request that the requester A' sends to the identity authentication system 1 through the client 2, and establishes the interaction between the requester A' and the identity authentication system 1. At this point, it is assumed that the requester A' requires identity authentication as the user A.

Step S102: the dynamic security code generating module 13 randomly selects several characters from the preset global character codebook to constitute a dynamic security code, and transmits the dynamic security code to the client 2 of the requester A'. For example, at this point, the dynamic security code generating module 13 randomly selects four numbers, i.e., "1", "3", "5" and "8", to constitute a dynamic security code "1358", and sends the dynamic security code to the client 2 of the requester A'.

Step S103: the client 2 displays the dynamic security code "1358", the requester A' reads out the dynamic security code, at this time, the client 2 captures the speech generated when the requester A' reads out the dynamic security code, and the client 2 transmits the captured speech to the identity authentication system 1 in the form of a security code speech signal.

Step S104: the identity authentication module 14 extracts the voiceprint model of the user A from the voiceprint model storage unit 15, and divides the received security code speech signal of the requester A' into several frames of speech data, for example, it is assumed that the received security code speech signal is divided into ten frames of speech data, i.e., $x_1, x_2, \ldots, x_{10}$.

Step S105: the identity authentication module 14 tests each frame of speech data $x_1, x_2, \ldots, x_{10}$ on the voiceprint model of the user A respectively to obtain the security code content confidences $CL_1(1)$, $CL_1(2)$, . . . , $CL_1(10)$, and further calculates the average of these security code content confidences $CL_1(1)$, $CL_1(2)$, . . . , $CL_1(10)$ according to the above Equation 1) to obtain the security code content confidence average $\overline{CL_1}$.

Step S106: for each frame of the speech data $x_1$, $x_2, \ldots, x_{10}$, the identity authentication module 14 performs likelihood calculation on the voiceprint model of the user A and the acoustic model of the global characters respectively, and calculates the difference between the values of the likelihood functions according to the above Equation 2) to obtain the requester identity speech confidences $CL_2(1)$, $CL_2(2)$, $CL_2(10)$, and further calculates the average of these requester identity speech confidences $CL_2(1)$, $CL_2(2)$, . . . , $CL_2(10)$ according to the above Equation 3) to obtain the requester identity speech confidence average $\overline{CL_2}$.

Step S107: the identity authentication module 14 calculates the comprehensive confidence CL of the identity of the requester A' according to the above Equation 4).

Step S108: the identity authentication module 14 judges whether or not the calculated comprehensive confidence CL of the identity is greater than or equal to the preset confidence threshold, and when the comprehensive confidence CL of the identity is greater than or equal to the preset confidence threshold, the process proceeds to step S109, otherwise, the process proceeds to step S110.

Step S109: since the comprehensive confidence CL of the identity is greater than or equal to the preset confidence threshold, the identity authentication result is that the requester A' is the user A of the server; the identity authentication system 1 sends the identity authentication result back to the client 2, and the requester A' is allowed to access the server as the user A to operate.

Step S110: since the comprehensive confidence CL of the identity is less than the preset confidence threshold, the identity authentication result is that the requester A' is not the user A of the server; the identity authentication system 1 sends the identity authentication result back to the client 2, and the requester A' is refused to access the server as the user A to operate.

As can be seen from the above example, in the present invention, the security code content confidence average $\overline{CL_1}$ as well as the requester identity speech confidence average $\overline{CL_2}$ are incorporated when the comprehensive confidence CL of the identity is calculated. It is possible to verify whether or not the requester A' has correctly read out the dynamic security code "1358", and to verify whether or not the speech of the requester A' is consistent with the voiceprint model of the user A, therefore, it is possible to improve the security and reliability of identity authentication and to effectively lower the risk that others pretend to be the user to access system when the user's speech is embezzled.

In addition, in order to eliminate the influence on the accuracy of the identity authentication result due to the temporal variation, an automatic reconstruction subsystem 20 for the voiceprint model, which is used for reconstructing the voiceprint model of the user, is further provided in the identity authentication system 1 of the present invention. Next, the automatic reconstruction subsystem 20 for the voiceprint model will be described in detail.

As shown in FIG. 1, when the identity authentication result is that the requester is the user of the server (i.e., the authentication is successful), the automatic reconstruction subsystem 20 for the voiceprint model acquires the security code speech signal transmitted to the identity authentication system 1 from the client 2, and the automatic reconstruction subsystem 20 for the voiceprint model operates only when the identity authentication result is that the requester is the user of the server (i.e., when the authentication is successful).

In the first embodiment, the automatic reconstruction subsystem 20 for the voiceprint model comprises a time-varying data storage unit 21, a time-varying data updating module 23, a time window channel construction module 24, and a voiceprint model reconstruction module 25.

Reasonable storage and presentation of time-varying speech data are critical to the implementation of the present invention, and therefore, the design and storage method of the time-varying data storage unit are of paramount importance. In the present invention, the time-varying data storage unit 21 is constructed with time labels, and each user's speech data at each time point is stored with a time label in the time-varying data storage unit 21. The time-varying data storage unit 21 is, for example, a database, but is not limited to a database, and may be other data storage form as long as it can be used for storing each user's speech data at each time point with a time label.

After the automatic reconstruction subsystem 20 for the voiceprint model receives the security code speech signal, the time-varying data updating module 23 stores the received security code speech signal as the latest speech data in the time-varying data storage unit 21, wherein the speech data of the user is stored with time labels in the time-varying data storage unit 21.

Figure 4:
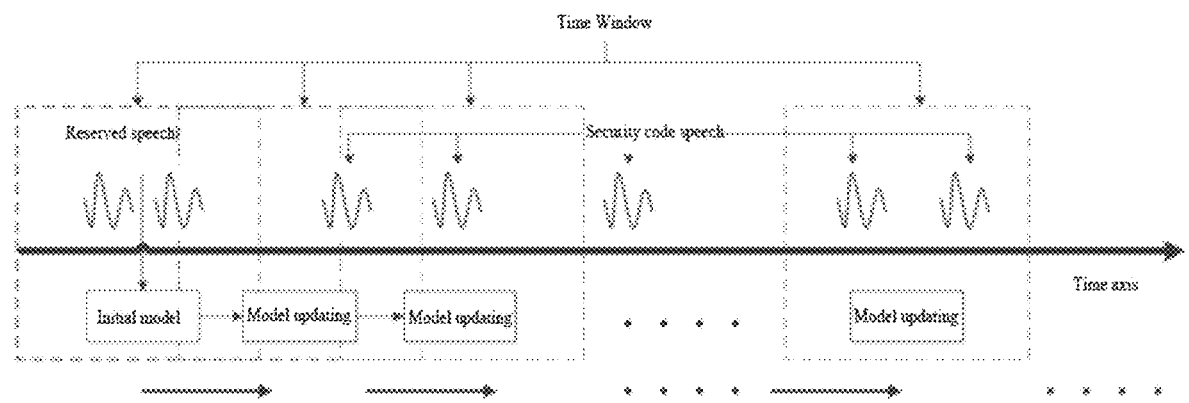
FIG. 4 is a schematic diagram of a time window channel model.

Further, the time window channel construction module 24 extracts the speech data of the user from the time-varying data storage unit 21 in the order of the time labels, constructs a time window channel including a plurality of sets of speech data, and updates the speech data included in the time window channel using the latest speech data. FIG. 4 shows a model of the time window channel, which takes a time window channel as a base unit, with the time axis as a displacement cue, the time window channel is moved sequentially in the time axis direction over time, the latest speech data obtained in real time is pushed into the time window channel and the speech data of the past time period is removed from the time window channel, and the time window channel includes a plurality of sets of speech data.

Figure 5:
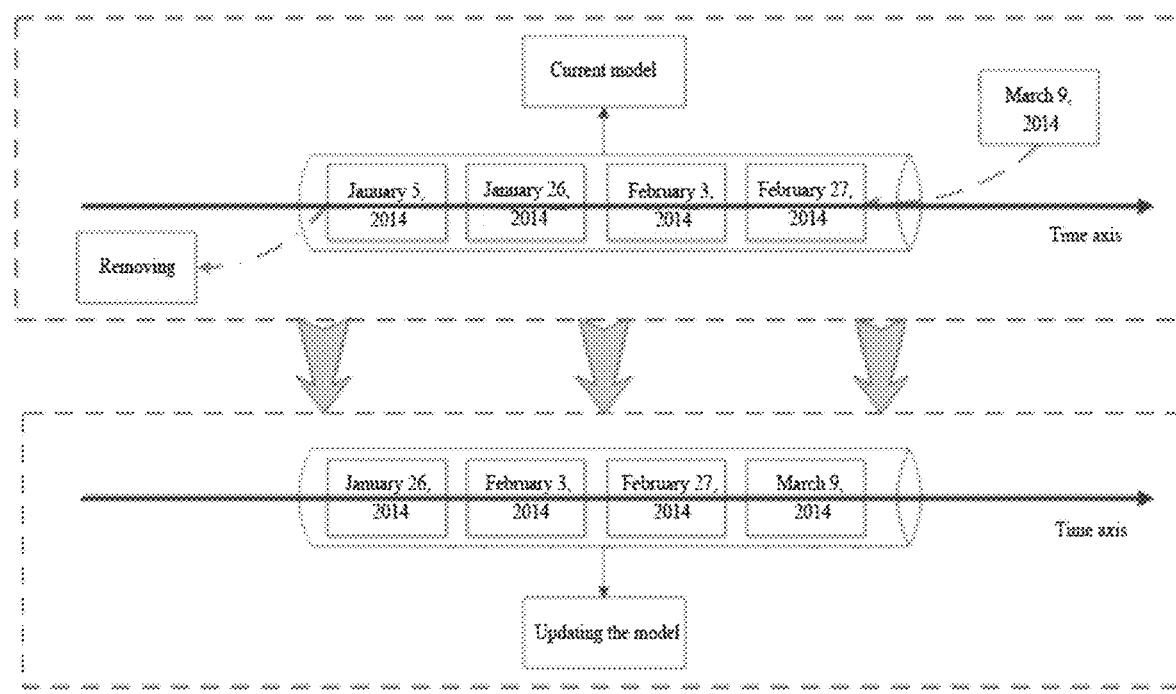
FIG. 5 is a diagram showing an example of application of the time window channel

FIG. 5 shows an application example of the time window channel As shown in FIG. 5, for example, the current time window channel includes four sets of speech data labeled by Jan. 5, 2014, Jan. 26, 2014, Feb. 3, 2014, and Feb. 27, 2014. The latest speech data of the user is acquired on Mar. 9, 2014, and the time window channel construction module 24 updates the speech data included in the time window channel, the latest speech data, labeled by Mar. 9, 2014, is pushed into the time window channel, and the speech data of the past time period, i.e., the speech data labeled by the Jan. 5, 2014, is removed from the time window channel. The number of sets of the speech data included in the time window channel shown in FIG. 5 is only an example. In practice, the number of sets of the speech data included in the time window channel can be set in accordance with specific conditions.

Next, the voiceprint model reconstruction module 25 reconstructs the voiceprint model of the user using the plurality of sets of speech data included in the updated time window channel, and updates the voiceprint model of the user in the voiceprint model storage unit 15 using the reconstructed voiceprint model of the user.

Thus, when the identity authentication is performed thereafter, the identity authentication system 1 is able to obtain the latest voiceprint model of the user from the voiceprint model storage unit 15 and calculate the comprehensive confidence CL of the identity using the latest voiceprint model of the user. The user's own physiological characteristics and pronunciation characteristics will change over time, the hardware will be aging, and the fidelity of the recording equipment will decline, but in the present invention, by constructing the model of the time window channel to dynamically reconstruct the voiceprint model of the user, it is possible to track the pronunciation characteristics of the user in real time, and can improve the accuracy of the voiceprint model of the user effectively, thereby improving the accuracy of identity authentication.

Figure 6:
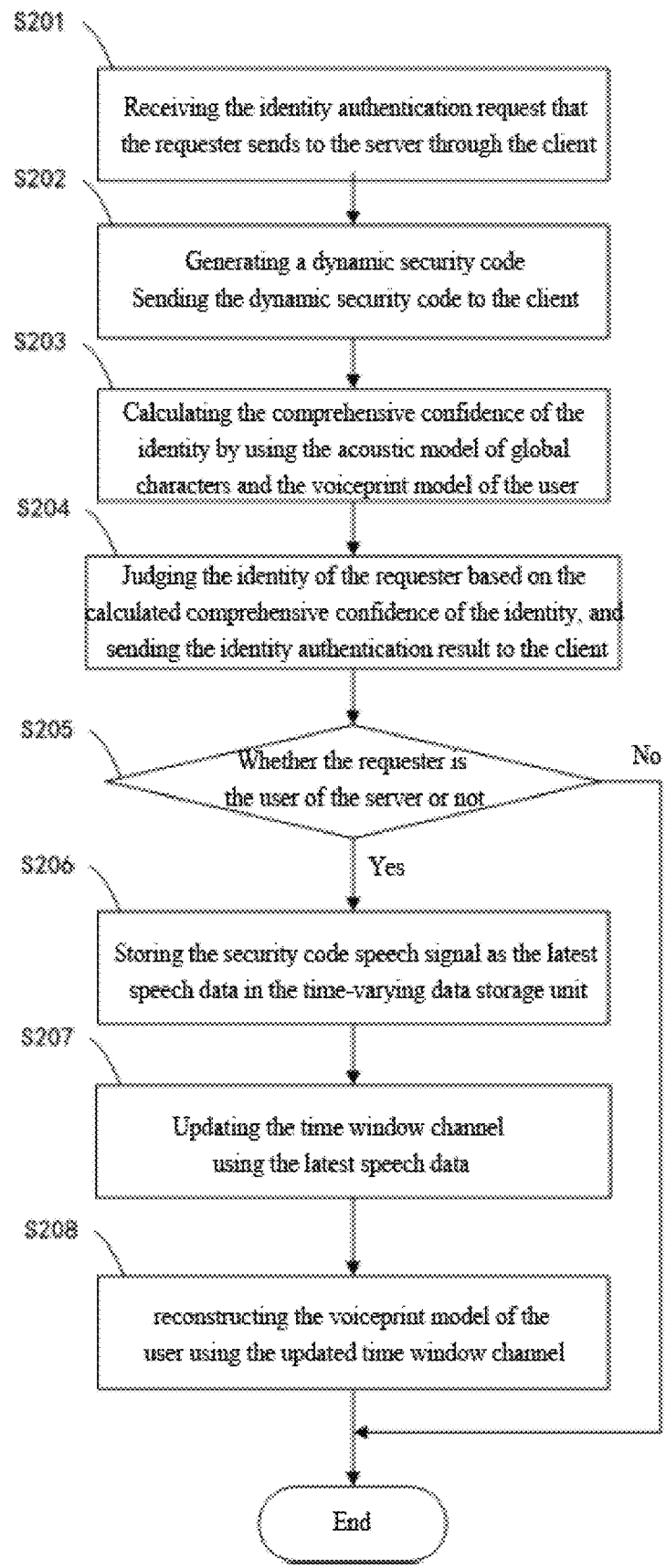
FIG. 6 is a flowchart of a dynamic security code speech-based identity authentication method having self-learning function according to the first embodiment.

FIG. 6 shows a flow of a dynamic security code speech-based identity authentication method having self-learning function according to the first embodiment.

Step S201: receiving the identity authentication request that a requester sends to a server through a client;

Step S202: generating a dynamic security code and sending the dynamic security code to the client;

Step S203: calculating the comprehensive confidence CL of the identity of the requester by using the acoustic model of the global characters and the voiceprint model of the user based on the security code speech signal sent from the client, wherein the security code speech signal is generated when the requester reads out the dynamic security code;

Step S204: judging the identity of the requester based on the calculated comprehensive confidence CL of the identity, and sending the identity authentication result to the client;

Step S205: when the identity authentication result is that the requester is the user of the server, the process proceeds to step S206, otherwise the process is terminated;

Step S206: storing the security code speech signal as the latest speech data in the time-varying data storage unit in which speech data of each user is stored with time labels;

Step S207: extracting speech data of the user from the time-varying data storage unit in the order of the time labels, constructing a time window channel including a plurality of sets of speech data, and updating the speech data included in the time window channel using the latest speech data (i.e., pushing the latest speech data into the time window channel, and removing the speech data of the past time period from the time window channel);

Step S208: reconstructing the voiceprint model of the user using the plurality of sets of speech data included in the updated time window channel According to the first embodiment of the present invention, the comprehensive confidence of the identity is obtained by combining the security code content confidence average with the requester identity speech confidence average, and identity authentication based on dynamic security code speech is performed by using the comprehensive confidence of the identity. Thus, it is possible to provide a system and method for dual identity authentication which can not only verify the dynamic security code content, but also verify the voiceprint of the speaker, and may improve the security and reliability of identity authentication. In addition, according to the first embodiment of the present invention, a time-varying data storage unit based on time variation is constructed, and a model of the time window channel is constructed, wherein a plurality of sets of the time-dependent speech data of the user are included in the time window channel By dynamically reconstructing the voiceprint model of the user through the model of the time window channel, it is possible to effectively improve the accuracy of identity authentication, and to have the self-learning function.

[Second Embodiment]

Figure 7:
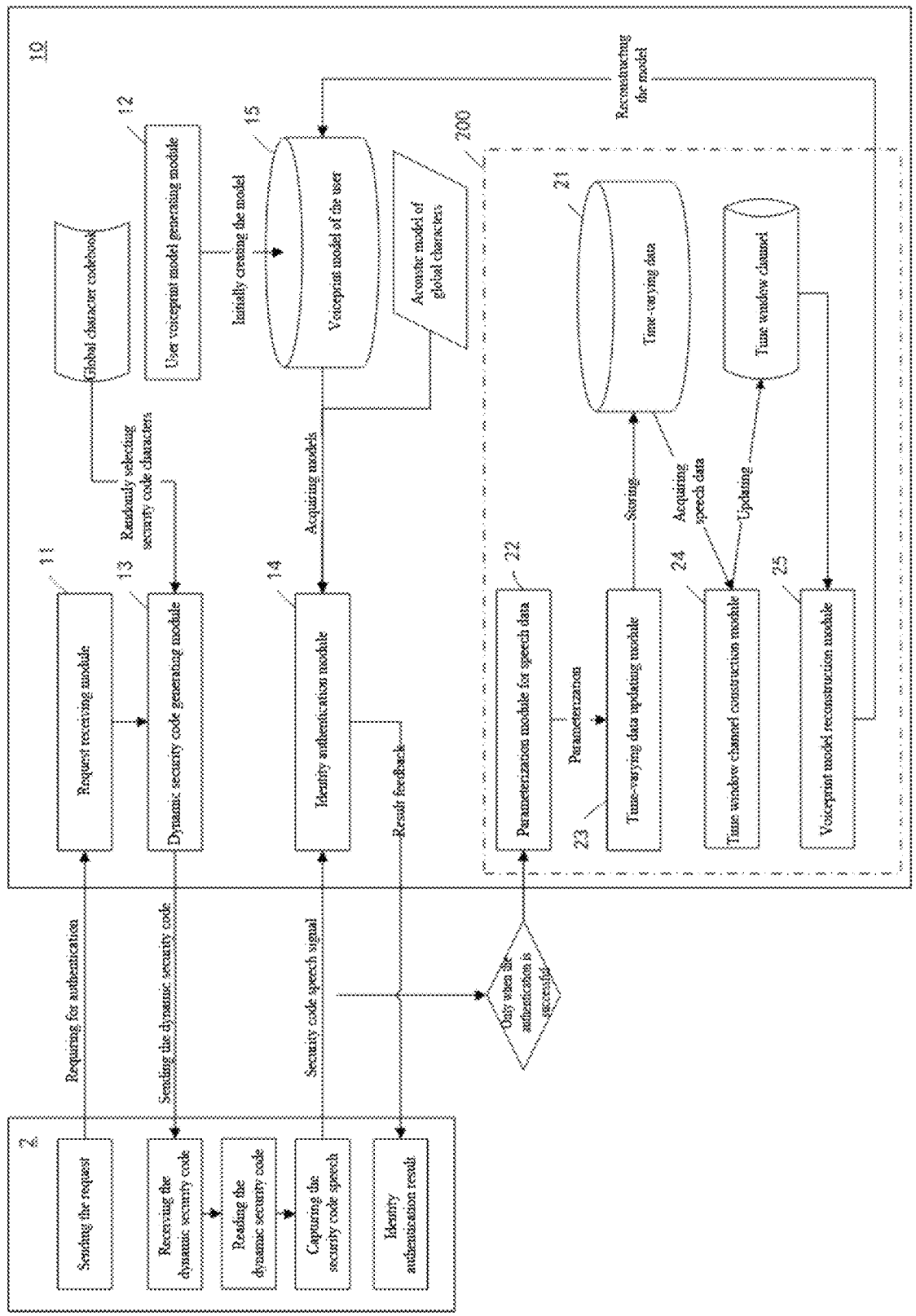
FIG. 7 is a schematic diagram of a dynamic security code speech-based identity authentication system having self-learning function according to the second embodiment.

FIG. 7 is a schematic diagram of a dynamic security code speech-based identity authentication system 10 having self-learning function (hereinafter referred to as "identity authentication system 10") according to the second embodiment. The same constituent elements as those of the first embodiment are denoted by the same reference numerals, and the detailed description thereof will be omitted.

The second embodiment is different from the first embodiment in that: the automatic reconstruction subsystem 200 for the voiceprint model further comprises a parameterization module 22 for speech data, the parameterization module 22 for speech data is used for parameterizing the security code speech signal, i.e., speech data, to obtain the latest parameterized speech data, that is, the feature parameters capable of characterizing the speaker's personality information is obtained; the time-varying data updating module 23 updates the time-varying data storage unit 21 using the latest parameterized speech data; parameterized speech data is stored with time labels in the time-varying data storage unit 21; the time window channel construction module 24 constructs a time window channel including a plurality of sets of parameterized speech data by using the parameterized speech data, and updates the parameterized speech data included in the time window channel using the latest parameterized speech data; and the voiceprint model reconstruction module 25 reconstructs the voiceprint model of the user using the plurality of sets of parameterized speech data included in the updated time window channel.

That is, in the second embodiment, after obtaining the speech data (security code speech signal) of the user, the speech data is parameterized by the parameterization module 22 for speech data, and the parameterized speech data obtained by the parameterization process is used in the subsequent processing.

If the speech data of the user is directly stored in the time-varying data storage unit 21, it is not only difficult to store, but also occupies a large amount of storage space, which is disadvantageous to the management maintenance and the persistent storage of the storage unit. Therefore, it is preferable that the speech data is parameterized by the parameterization module 22 for speech data in units of frames to obtain parameterized speech data (i.e., the parameterized speech data), the parameterized speech data is the feature parameters capable of characterizing the speaker's personality information.

Preferably, the parameterization module 22 for speech data performs Speech Activity Detection/Voice Activity Detection (VAD) on the speech data before performing the parameterization processing, thereby deleting the silence portion of the speech data, reducing the influence of the noise, and reducing the size of the speech data. After the Voice Activity Detection is performed, the parameterization module 22 for speech data parameterizes the remaining speech data to obtain the parameterized speech data. As a result, it is possible to further effectively save the storage space for storing the speech data.

Preferably, the parameterization module 22 for speech data uses Mel Frequency Cepstrum Coefficient (MFCC) as the feature parameter, and only saves the zero-order MFCC feature when performing the parameterization processing on the speech data, so as to achieve dimensionality reduction of the speech signal, which can save the storage space for storing the speech data. In the subsequent processing, the following Equation 5) can be used for converting the zero-order MFCC feature to the corresponding first order Delta and second order Delta features.

$$pFrame[i]=(2*(f_2[i]-b_2[i])+(f_1[i]-b_1[i]))/10 \qquad 5)$$

In Equation 5), pFrame[i] represents the parameterized speech data frame, $f_1[i]$, $f_2[i]$ represent the feature values of the first and second preceding frames of the i-th frame of speech data, respectively, and $b_1[i]$, $b_2[i]$ represent the feature values of the first and second subsequent frames of the i-th frame of speech, respectively.

Figure 14:
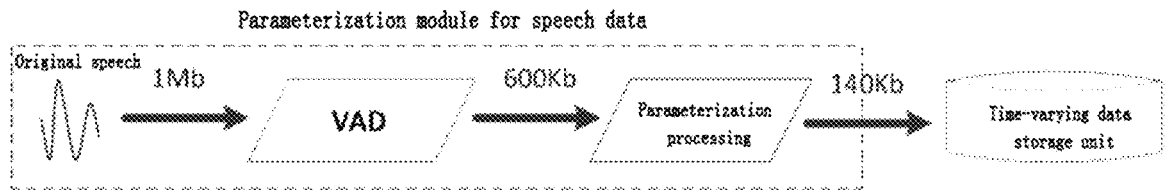
FIG. 14 is a schematic diagram showing an example of parameterization processing of speech data.
Figure 15:
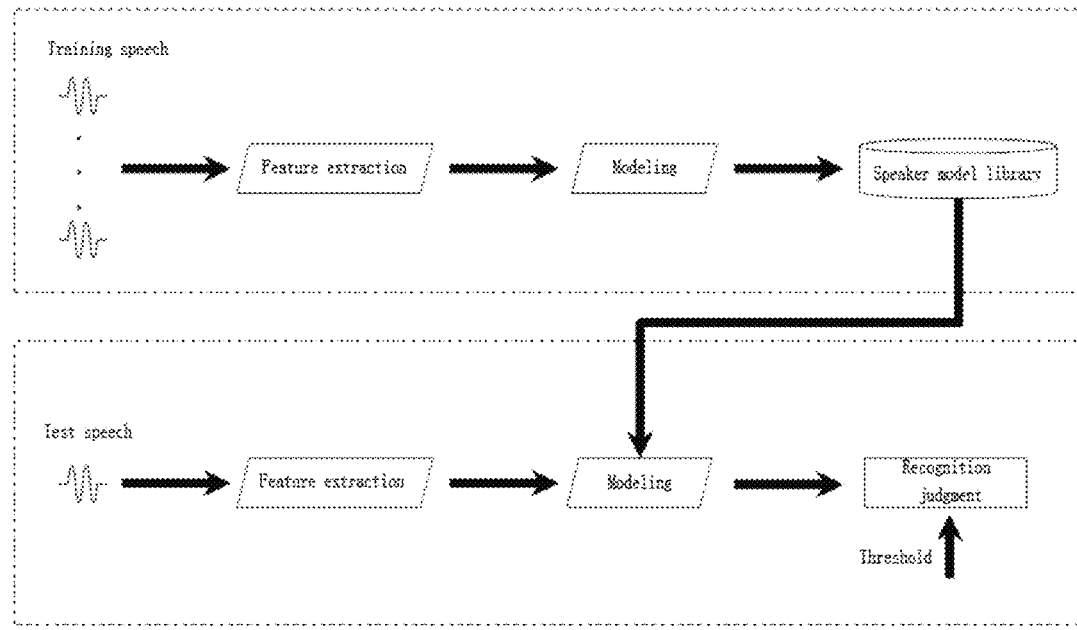
FIG. 15 is a schematic diagram of a typical speaker recognition system.

As shown in FIG. 14, for example, for a piece of original speech data which has a size of 1 Mb and is in way format, first, the original speech data of 1 Mb is subjected to voice activity detection, thereby deleting the silence portion of the original speech data and reducing the influence of the noise, so that effective speech data of 600 Kb is obtained. Then, using Mel Frequency Cepstrum Coefficient (MFCC) as the feature parameter, speech data of 600 Kb is parameterized in units of frames, and thus, parameterized speech data of 140 Kb is obtained. Compared with the original speech data, it is possible to save about 90% of the storage space.

The latest parameterized speech data is stored in the time-varying data storage unit 21 by the time-varying data updating module 23, and parameterized speech data of the user is stored with time labels in the time-varying data storage unit 21.

The time window channel construction module 24 extracts parameterized speech data of the user from the time-varying data storage unit 21 in the order of the time labels, constructs a time window channel including a plurality of sets of parameterized speech data, and updates the parameterized speech data included in the time window channel using the latest parameterized speech data. The processes of constructing and updating the time window channel by the time window channel construction module 24 are the same as that of the first embodiment, except that the parameterized speech data is used instead of the speech data of the user.

In addition, the voiceprint model reconstruction module 25 reconstructs the voiceprint model of the user using the plurality of sets of parameterized speech data included in the updated time window channel.

Figure 8:
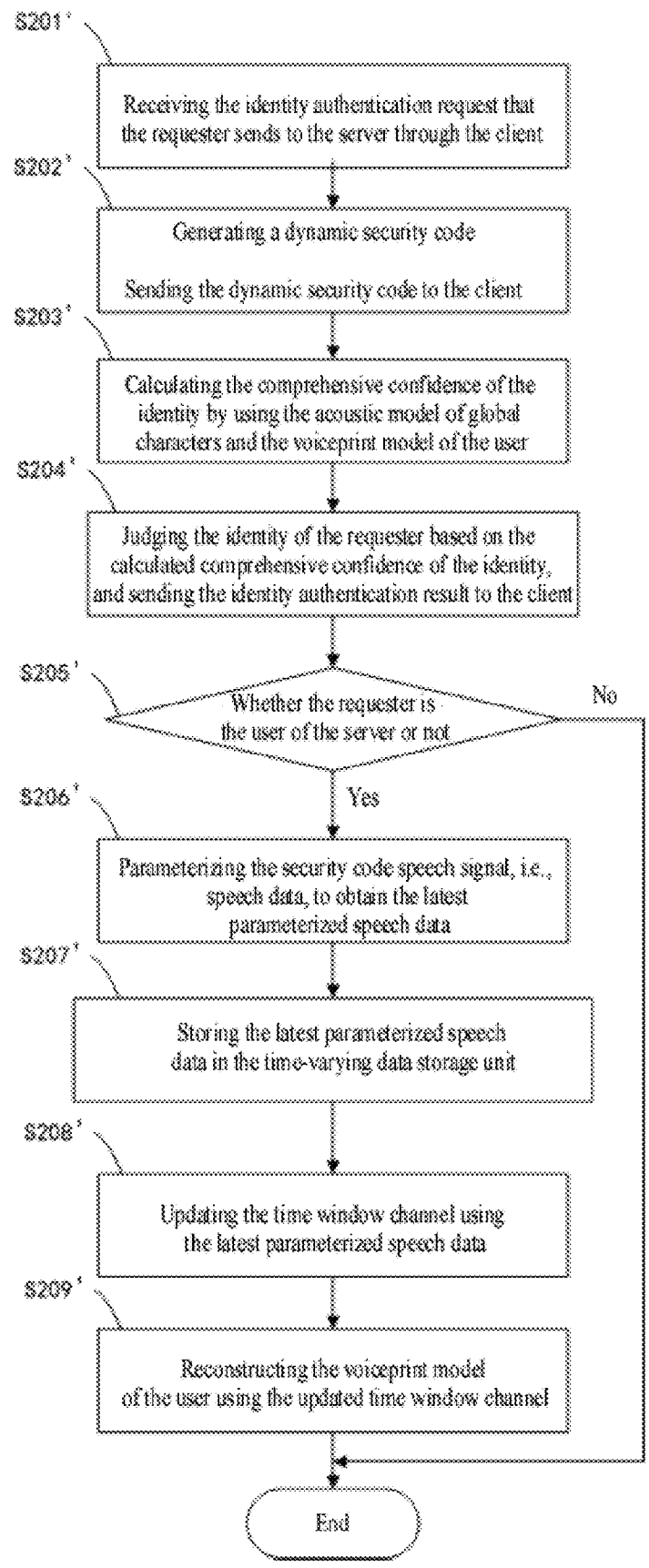
FIG. 8 is a flowchart of a dynamic security code speech-based identity authentication method having self-learning function according to the second embodiment.

FIG. 8 shows a flow of a dynamic security code speech-based identity authentication method having self-learning function according to the second embodiment, wherein steps S201' to S205' are the same as steps S201 to S205 in FIG. 6 of the first embodiment, and therefore, the description of steps S201' to S205' is omitted.

Step S206': parameterizing the security code speech signal, i.e., the speech data, captured by the client, so as to obtain the latest parameterized speech data;

Step S207': storing the latest parameterized speech data in the time-varying data storage unit, wherein parameterized speech data of each user is stored with time labels in the time-varying data storage unit;

Step S208': extracting parameterized speech data of the user from the time-varying data storage unit in the order of the time labels, constructing a time window channel including a plurality of sets of parameterized speech data, and updating the parameterized speech data included in the time window channel using the latest parameterized speech data (i.e., pushing the latest parameterized speech data into the time window channel, and removing the parameterized speech data of the past time period from the time window channel);

Step S209': reconstructing the voiceprint model of the user using the plurality of sets of parameterized speech data included in the updated time window channel.

The second embodiment of the present invention is optimized for the technical solution described in the first embodiment, and the storage space for storing the speech data can be substantially saved by parameterizing the original speech data, and the parameterized speech data is also used in subsequent processing, whereby it is possible to reduce the size of the storage space for temporarily storing speech data.

[Third Embodiment]

Figure 9:
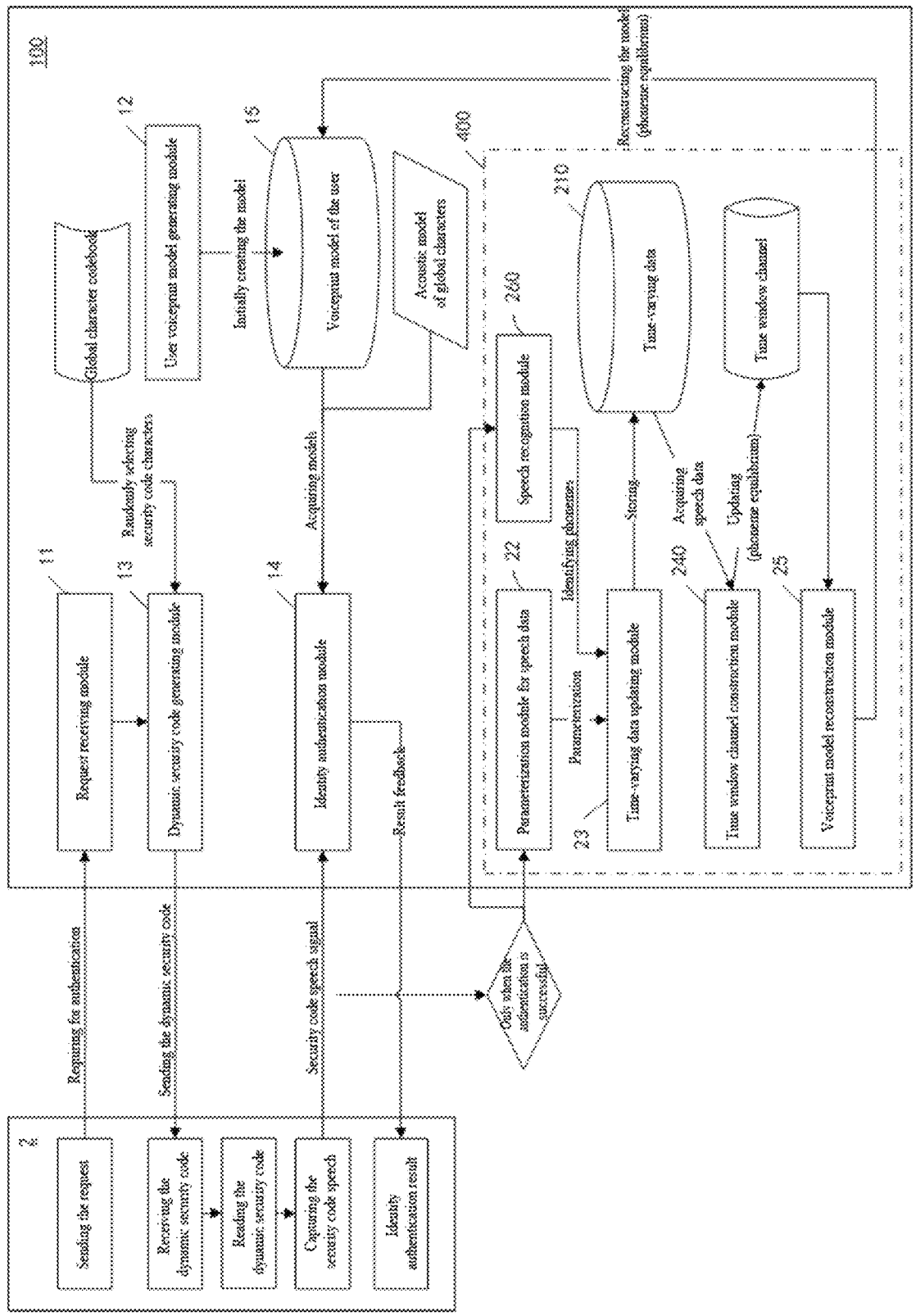
FIG. 9 is a schematic diagram of a dynamic security code speech-based identity authentication system having self-learning function according to the third embodiment.

FIG. 9 is a schematic diagram of a dynamic security code speech-based identity authentication system 100 having self-learning function (hereinafter referred to as "identity authentication system 100") according to the third embodiment. The same constituent elements as those of the first and second embodiments are denoted by the same reference numerals, and the detailed description thereof will be omitted.

The identity authentication system 100 according to the third embodiment is different from the identity authentication system 10 according to the second embodiment in that: the automatic reconstruction subsystem 400 for the voiceprint model in the identity authentication system 100 further comprises a speech recognition module 260; phonemes corresponding to the latest parameterized speech data and frame intervals corresponding to the phonemes are further stored in the time-varying data storage unit 210; and the time window channel construction module 240 updates the parameterized speech data included in the time window channel based on the phonemes corresponding to the latest parameterized speech data, so that the phonemes corresponding to the plurality of sets of parameterized speech data included in the time window channel are evenly distributed.

For example, in the case that the global character codebook consists of the ten numbers (i.e., 0 to 9), if the voiceprint model of the user is reconstructed without considering the distribution of the numbers used in the dynamic security codes generated in the past time period, it may lead to the phenomenon that the distribution of the phonemes is unbalanced in the reconstructed voiceprint model of the user, which leads to the decrease of the recognition accuracy of specific numbers, and is not conducive to the stability of the identity authentication.

Figure 10:
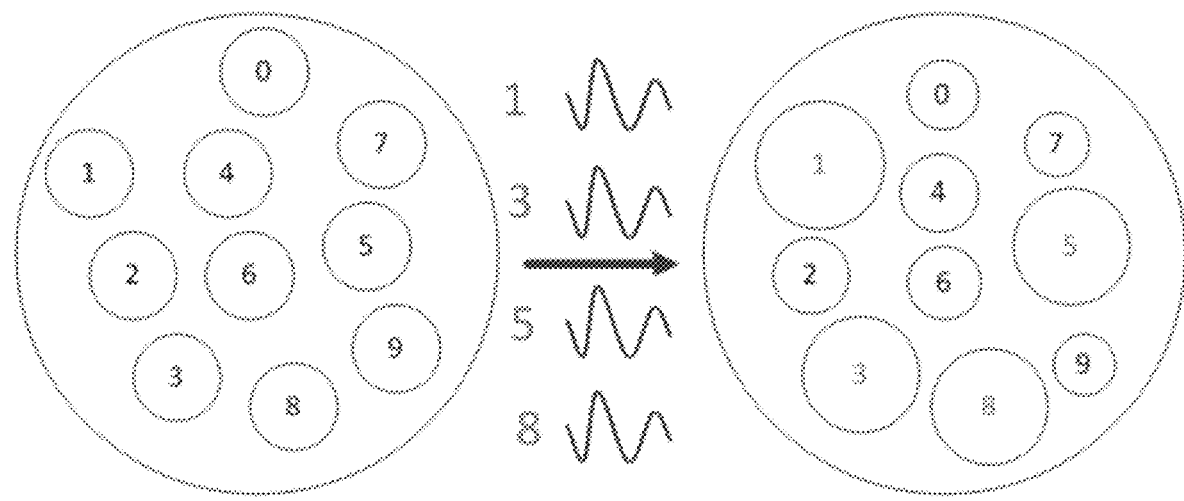
FIG. 10 is a schematic diagram of the spatial distribution of the digital model.

As shown in FIG. 10, if the voiceprint model of the user is reconstructed simply based on the security code speech signal of the dynamic security code "1358" without considering the distribution of the numbers, in the case that the user reads out a dynamic security code comprising "0", "2", "4", "6", "7", "9", the accuracy is likely to decrease when calculating the comprehensive confidence CL of the identity based on the reconstructed voiceprint model of the user. Therefore, in the third embodiment of the present invention, the distribution of the phonemes is further judged.

The automatic reconstruction subsystem 400 for the voiceprint model according to the third embodiment further comprises a speech recognition module 260 for recognizing the phonemes corresponding to the respective frames in the speech data, so as to obtain a correspondence relationship between the phonemes and the frames.

Specifically, the speech recognition module 260 recognizes the phonemes corresponding to respective frames in the security code speech signal, i.e., the speech data. After the speech data is parameterized by the parameterization module 22 for speech data, the time-varying data updating module 23 stores the parameterized speech data (i.e., the latest parameterized speech data), the phonemes corresponding to respective frames in the speech data (i.e., the phonemes corresponding to the latest parameterized speech data) and the frame intervals corresponding to the phonemes (i.e., the start frame tag and the end frame tag corresponding to the phonemes) in the time-varying data storage unit 210.

Figure 11:
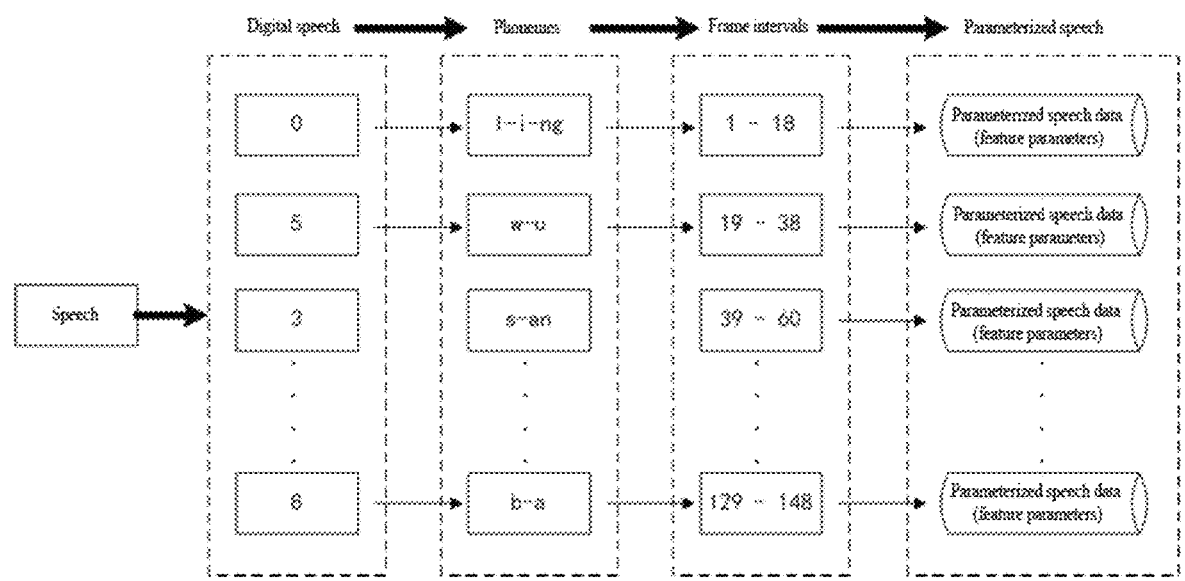
FIG. 11 is a schematic diagram of the storage architecture of a time-varying data storage unit according to the third embodiment.

FIG. 11 shows a storage mode of the time-varying data storage unit 210. As shown in FIG. 11, each phoneme recognized by the speech recognition module 260, the frame interval corresponding to each phoneme, and the parameterized speech data corresponding to each of the frame intervals are stored in the time-varying data storage unit 210 in a tree-like storage structure, so that the phoneme, frame interval, and parameterized speech data are interrelated. With such a tree-like storage structure, it is easy to manage the time-varying data storage unit 210, facilitating query and error detection.

In the time-varying data storage unit 210 according to the third embodiment, not only the time variation but also the distribution of the phonemes is considered when the time window channel is moved (updated). That is, for example, in the third embodiment, the time window channel construction module 240 may update the time window channel using the following two modes.

Figure 12:
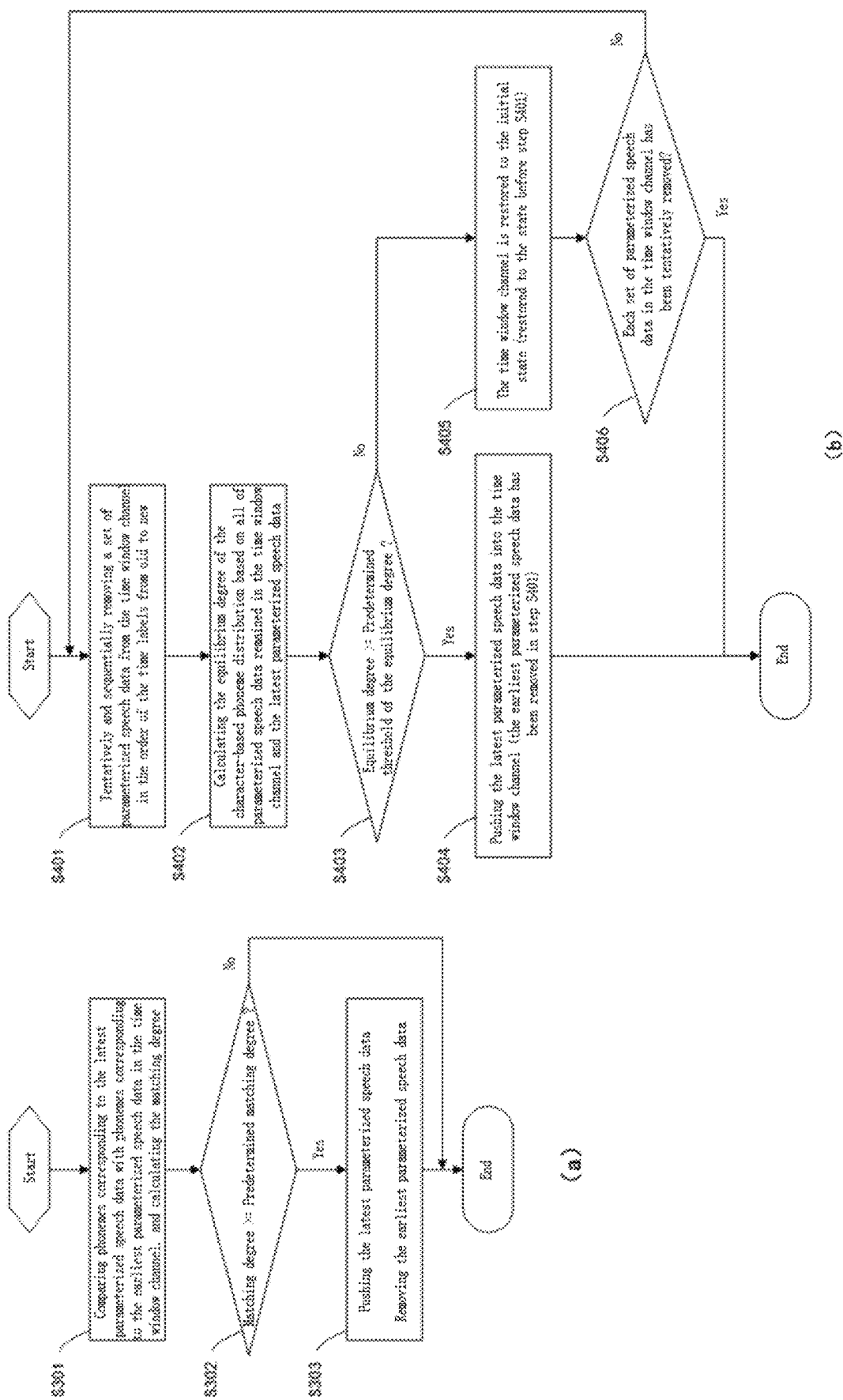
FIG. 12 is a flowchart showing a processing flow when the time window channel is updated in the third embodiment.

First Mode:

FIG. 12(*a*) shows the processing flow of the first mode. In step S301, the phonemes corresponding to the latest parameterized speech data are compared with the phonemes corresponding to the earliest parameterized speech data (the parameterized speech data with the oldest time label) in the time window channel, so as to calculate the matching degree between the phonemes corresponding to the latest parameterized speech data and the phonemes corresponding to the earliest parameterized speech data in the time window channel In step S302, the matching degree is judged, and if the matching degree is greater than or equal to a predetermined matching degree (e.g., 90% of the phonemes are consistent), the process proceeds to step S303, otherwise the parameterized speech data included in the time window channel is not updated and the process is terminated. In step S303, the latest parameterized speech data is pushed into the time window channel, and the earliest parameterized speech data is removed from the time window channel In the first mode, the time window channel is updated only when the matching degree of the phonemes corresponding to the latest parameterized speech data and the phonemes corresponding to the earliest parameterized speech data is greater than or equal to the predetermined matching degree, so that the phonemes corresponding to the plurality of sets of parameterized speech data included in the time window channel are evenly distributed.

Second Mode:

FIG. 12(b) shows the processing flow of the second mode. In step S401, a set of parameterized speech data is tentatively removed from the time window channel sequentially in the order of the time labels from old to new. In step S402, the equilibrium degree of the character-based phoneme distribution is calculated on the basis of phonemes corresponding to all of the parameterized speech data remained in the time window channel and the latest parameterized speech data. In step S403, the equilibrium degree is judged, and if the equilibrium degree is greater than or equal to the predetermined threshold of the equilibrium degree, the process proceeds to step S404, otherwise, the process proceeds to step S405. In step S404, the latest parameterized speech data is pushed into the time window channel (parameterized speech data of the past time period has been removed in step S401), and then the process is terminated. In step S405, the time window channel is restored to its initial state, i.e., the set of parameterized speech data which is tentatively removed in step S401 is restored to the time window channel In step S406, it is judged whether or not each set of parameterized speech data in the time window channel has been tentatively removed, if there is parameterized speech data that has not yet been tentatively removed, the process returns to step S401, and the next set of parameterized speech data is tentatively removed from the time window channel in the order of the time labels from old to new, otherwise, the parameterized speech data included in the time window channel is not updated and the process is terminated.

In the second mode, the time window channel is updated only when it is possible to ensure that the phonemes corresponding to the plurality of sets of parameterized speech data included in the time window channel are evenly distributed.

Figure 13:
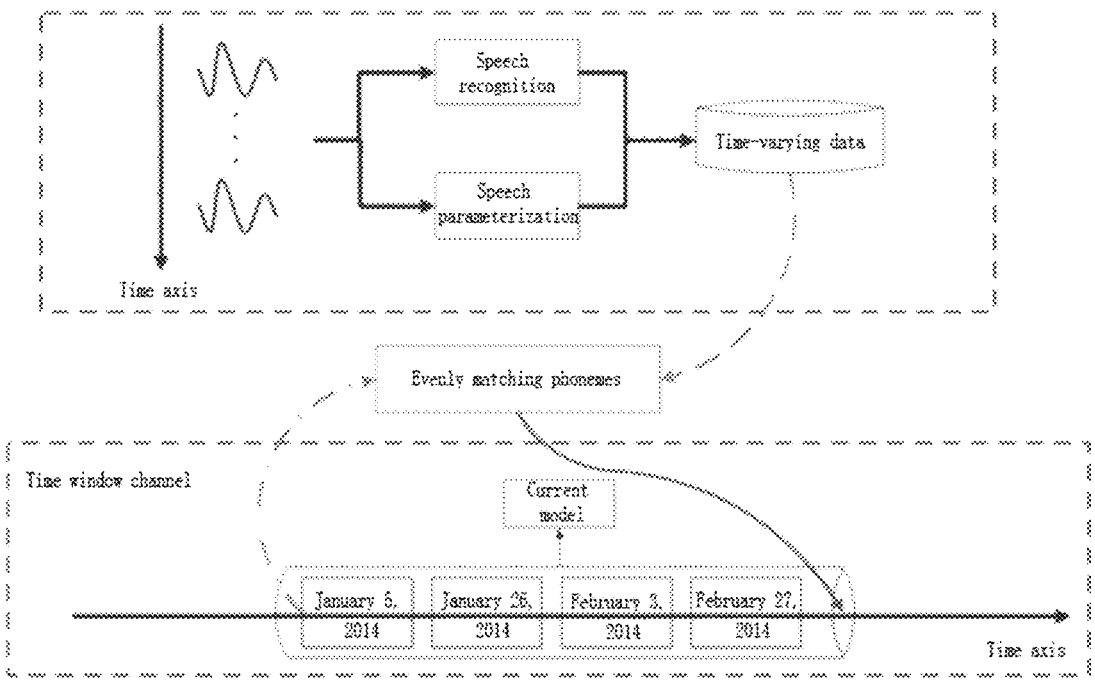
FIG. 13 is a schematic diagram showing a process when the time window channel is updated in the third embodiment.

Whether the first mode or the second mode is used, the parameterized speech data included in the time window channel is updated in a manner such that the phonemes corresponding to the plurality of sets of parameterized speech data included in the time window channel are evenly distributed, based on the phonemes corresponding to the latest parameterized speech data. FIG. 13 schematically shows the processing in updating the time window channel in the third embodiment.

In addition, according to the actual application, either the first mode or the second mode may be used, alternatively, the first mode or the second mode may be tentatively utilized to update the time window channel, when the time window channel is not updated because the updating condition is not satisfied (the matching degree is low or the equilibrium degree is low), the second mode or the first mode is further tentatively utilized to update the time window channel, so as to maximize the use of the latest speech data to reconstruct the voiceprint model of the user.

Preferably, the parameterized speech data of the past time period is deleted from the time-varying database 210 when the parameterized speech data of the past time period is removed from the time window channel, so that the time-varying data storage unit 210 is maintained in a relatively stable size, thereby facilitating the maintenance and management of the time-varying data storage unit 210.

Next, similarly to the second embodiment, the voiceprint model reconstruction module 25 reconstructs the voiceprint model of the user using the plurality of sets of parameterized speech data included in the updated time window channel, and updates the reconstructed voiceprint model of the user into the voiceprint model storage unit 15.

The third embodiment of the present invention further optimizes the technical scheme described in the second embodiment to update the parameterized speech data included in the time window channel according to the distribution of the phonemes, it is possible to effectively reduce the phenomenon of uneven distribution of the phonemes in the voiceprint model of the user, to effectively improve the accuracy of the voiceprint model of the user, which can improve the accuracy of identity authentication.

[Fourth Embodiment]

The fourth embodiment differs from the first, second, and third embodiments described above in that: the voiceprint model reconstruction module reconstructs the voiceprint model of the user in different modes according to the updating frequency for updating the speech data (first embodiment) or the parameterized speech data (the second embodiment and the third embodiment) stored in the time-varying data storage unit.

In order to train a more accurate voiceprint model of the user, it is required to track the pronunciation characteristics of the user in real time. However, the frequency how often each user uses the system is different, thereby resulting in a different updating frequency for updating the speech data or the parameterized speech data stored in the time-varying data storage unit; if the voiceprint model of the user is reconstructed in the same way without considering the updating frequency (that is, the frequency how often the user uses the system), there may be a relatively low accuracy of the reconstructed voiceprint model of the user.

For this reason, in the fourth embodiment, when the voiceprint model of the user is reconstructed, the updating frequency for updating the speech data or the parameterized speech data stored in the time-varying data storage unit is estimated, and the voiceprint model of the user is reconstructed in different modes according to the estimated result.

If the updating frequency for updating the speech data or the parameterized speech data of the user stored in the time-varying data storage unit is smaller than the predetermined frequency, the voiceprint model of the user is reconstructed in a model adaptation manner. In this way, the voiceprint model of the user is reconstructed with the small amount of the latest speech data or parameterized speech data, it is possible to solve the problem that the speech data for training is less, and the speech data or the parameterized speech data stored in the time-varying data storage unit can be used to the maximum extent. In addition, the speed for reconstructing the voiceprint model of the user can be improved by using the model adaptation manner, and the reconstruction efficiency is higher. Here, the model adaptation manner refers to self-adapting on the original voiceprint model of the user to obtain a new voiceprint model of the user.

If the updating frequency for updating the speech data or the parameterized speech data of the user stored in the time-varying data storage unit is larger than the predetermined frequency, the voiceprint model of the user is reconstructed in a direct re-training manner. Compared with utilizing the model adaptation manner, the direct re-training manner can avoid the problem of the instability of the voiceprint model of the user caused by repeated model adaptation, and a more accurate voiceprint model of the user may be obtained by utilizing the direct re-training manner, which can more accurately reflect the current pronunciation characteristics of the user. Here, the direct re-training manner refers to self-adapting on the acoustic model of the global characters to obtain a new voiceprint model of the user.

The self-adaptation may be achieved by, for example, the maximum likelihood linear regression (MLLR) algorithm or the maximum a posteriori (MAP) algorithm.

In the fourth embodiment, the predetermined frequency may be set according to the actual situation. For example, take a week as a cycle, when the voiceprint model reconstruction module reconstructs a voiceprint model of a user, firstly, the number of sets of speech data or the parameterized speech data of the user updated into the time-varying data storage unit in one week is judged, if the number of sets is greater than or equal to the length of a time window channel (e.g., 10 sets), the voiceprint model of the user is reconstructed by utilizing the direct re-training manner; otherwise, the voiceprint model of the user is reconstructed by utilizing the model adaptation manner.

According to the fourth embodiment of the present invention, it is possible to reconstruct a voiceprint model of the user in a reasonable manner according to the actual operating frequency of the user, and to reconstruct a more accurate voiceprint model of the user.

The modules in the present invention may be implemented by hardware and/or software, a plurality of modules may be combined into one module, or one module may be split into a plurality of modules, as long as the merged or split module can achieve the corresponding function. The techniques described in the first to fourth embodiments of the present invention can be used in combination so that the system is optimized In addition, it should be noted that the "client" and the "server" in the present invention may be physically different devices or different logical processing units in the same physical device. For the former case, for example, the "client" and the "server" are the user's mobile phone and the server of the mobile service provider, respectively; for the latter case, for example, the "client" is the user's mobile phone, and the "server" is the hardware and/or software installed in the user's mobile phone for implementing the identity authentication function. For example, in the case where the present invention is applied to a mobile phone to realize screen-unlock function of the mobile phone, the "client" and the "server" are different logical processing units in the same physical device (mobile phone).

While several embodiments of the present invention have been described above, these embodiments are presented as examples and are not intended to limit the scope of the present invention. It will be apparent to those skilled in the art that the present invention may be implemented by various other means, various omissions, substitutions and alterations may be implemented without departing from the spirit of the present invention, and the technical solutions obtained by simple omissions, equivalents, and obvious modifications are included in the scope of the invention as set forth in the claims of the present invention.

The invention claimed is:

1. A dynamic security code speech-based identity authentication system having self-learning function, comprising:
 a request receiving module for receiving an identity authentication request that a requester sends to a server through a client;
 a dynamic security code generating module for generating a dynamic security code and sending the dynamic security code to the client; and
 an identity authentication module for calculating a comprehensive confidence of an identity of the requester by using an acoustic model of global characters and a voiceprint model of a user based on a security code speech signal sent from the client, wherein the security code speech signal is generated when the requester reads out the dynamic security code; judging the identity of the requester based on the calculated comprehensive confidence of the identity; and feeding an identity authentication result back to the client,
 wherein
 the dynamic security code speech-based identity authentication system is provided with an automatic reconstruction subsystem for the voiceprint model, and the voiceprint model of the user is reconstructed by the automatic reconstruction subsystem for the voiceprint model when the identity authentication result is that the requester is the user of the server, and
 the automatic reconstruction subsystem for the voiceprint model comprises:
  a time-varying data storage unit for storing speech data of each user with time labels;
  a time-varying data updating module for storing the security code speech signal as a latest speech data into the time-varying data storage unit;
  a time window channel construction module for extracting the speech data of the user from the time-varying data storage unit in an order of the time labels, constructing a time window channel including a plurality of sets of speech data, and updating the speech data included in the time window channel using the latest speech data; and
  a voiceprint model reconstruction module for reconstructing the voiceprint model of the user for the user using the plurality of sets of speech data included in the updated time window channel,
 wherein,
 the automatic reconstruction subsystem for the voiceprint model further comprises a parameterization module for speech data, and the parameterization module for speech data is used for parameterizing the security code speech signal, i.e., speech data, to obtain a latest parameterized speech data;
 parameterized speech data of each user is stored with time labels in the time-varying data storage unit;
 the latest parameterized speech data is stored in the time-varying data storage unit by the time-varying data updating module;
 the time window channel construction module extracts parameterized speech data of the user from the time-varying data storage unit in the order of the time labels, constructs a time window channel including a plurality of sets of parameterized speech data, and updates the parameterized speech data included in the time window channel using the latest parameterized speech data; and the voiceprint model reconstruction module reconstructs the voiceprint model of the user for the user using the plurality of sets of parameterized speech data included in the updated time window channel, the automatic reconstruction subsystem for the voiceprint model further comprises a speech recognition module for recognizing phonemes corresponding to respective frames in the speech data;

phonemes corresponding to the latest parameterized speech data and frame intervals corresponding to the phonemes are further stored in the time-varying data storage unit;

and the time window channel construction module updates the parameterized speech data included in the time window channel based on the phonemes corresponding to the latest parameterized speech data, so that phonemes corresponding to the plurality of sets of parameterized speech data included in the time window channel are evenly distributed, and, the time window channel construction module tentatively removes a set of parameterized speech data from the time window channel sequentially in the order of the time labels from old to new, and calculates an equilibrium degree of a character-based phoneme distribution based on all of parameterized speech data remained in the time window channel and the latest parameterized speech data, and if the equilibrium degree is greater than or equal to a predetermined threshold of the equilibrium degree, the latest parameterized speech data is pushed into the time window channel; otherwise, the set of parameterized speech data tentatively removed is restored to the time window channel, and then a next set of parameterized speech data is tentatively removed from the time window channel, and once again, the time window channel construction module calculates the equilibrium degree based on all of parameterized speech data remained in the time window channel and the latest parameterized speech data till each set of parameterized speech data included in the time window channel has been tentatively removed or the latest parameterized speech data has been pushed into the time window channel.

2. The dynamic security code speech-based identity authentication system having self-learning function according to claim 1, wherein the time window channel construction module compares the phonemes corresponding to the latest parameterized speech data with phonemes corresponding to an earliest parameterized speech data in the time window channel, and when a matching degree of the phonemes corresponding to the latest parameterized speech data and the phonemes corresponding to the earliest parameterized speech data is greater than or equal to a predetermined matching degree, the latest parameterized speech data is pushed into the time window channel, and the earliest parameterized speech data is removed from the time window channel.

3. The dynamic security code speech-based identity authentication system having self-learning function according to claim 1, wherein the voiceprint model reconstruction module estimates an updating frequency for updating the speech data of the user stored in the time-varying data storage unit, and if the updating frequency is less than a predetermined frequency, the voiceprint model of the user for the user is reconstructed in a model adaptation manner; otherwise, the voiceprint model of the user for the user is reconstructed in a direct re-training manner.

4. The dynamic security code speech-based identity authentication system having self-learning function according claim 1, wherein the voiceprint model reconstruction module estimates an updating frequency for updating the parameterized speech data of the user stored in the time-varying data storage unit, and if the updating frequency is less than a predetermined frequency, the voiceprint model of the user for the user is reconstructed in a model adaptation manner; otherwise, the voiceprint model of the user for the user is reconstructed in a direct re-training manner.

5. The dynamic security code speech-based identity authentication system having self-learning function according to claim 1, wherein the parameterization module for speech data performs voice activity detection on the speech data before performing a parameterization processing on the speech data.

6. The dynamic security code speech-based identity authentication system having self-learning function according to claim 1, wherein the parameterization module for speech data uses Mel Frequency Cepstrum Coefficient (MFCC) as a feature parameter, and only saves a zero-order MFCC feature when performing the parameterization processing on the speech data.

7. The dynamic security code speech-based identity authentication system having self-learning function according to claim 1, wherein the identity authentication module calculates the comprehensive confidence of the identity according to a following equation:

$$CL = \frac{1}{1 + e^{-(\overline{CL_1} + \alpha \cdot \overline{CL_2})}},$$

wherein CL is the comprehensive confidence of the identity, $\overline{CL_1}$ is a security code content confidence average, $\overline{CL_2}$ is a requester identity speech confidence average, $\alpha$ is an adjusting parameter of the security code content confidence average $\overline{CL_1}$ and the requester identity speech confidence average $\overline{CL_2}$, and $\alpha$ is a real number.

8. A dynamic security code speech-based identity authentication method having self-learning function, comprising following steps:

a request receiving step for receiving an identity authentication request that a requester sends to a server through a client;

a dynamic security code generating step for generating a dynamic security code and sending the dynamic security code to the client; and an identity authentication step for calculating a comprehensive confidence of an identity of the requester by using an acoustic model of global characters and a voiceprint model of a user based on a security code speech signal sent from the client, wherein the security code speech signal is generated when the requester reads out the dynamic security code; judging the identity of the requester based on the calculated comprehensive confidence of the identity; and feeding an identity authentication result back to the client, wherein when the identity authentication result is that the requester is the user of the server, following steps are further performed:

a time-varying data storing step for storing the security code speech signal as a latest speech data into a time-varying data storage unit in which speech data of each user is stored with time labels;

a time window channel construction step for extracting speech data of the user from the time-varying data storage unit in an order of the time labels, constructing a time window channel including a plurality of sets of speech data, and updating the speech data included in the time window channel using the latest speech data; and a model reconstruction step for reconstructing the voiceprint model of the user for the user using the plurality of sets of speech data included in the updated time window channel;

a parameterization step, and in the parameterization step, parameterizing the security code speech signal, i.e., speech data, to obtain a latest parameterized speech data;

in the time-varying data storing step, storing the latest parameterized speech data into the time-varying data storage unit in which parameterized speech data of each user is stored with time labels;

in the time window channel construction step, extracting parameterized speech data of the user from the time-varying data storage unit in the order of the time labels, constructing a time window channel including a plurality of sets of parameterized speech data, and updating the parameterized speech data included in the time window channel using the latest parameterized speech data; and in the model reconstruction step, reconstructing the voiceprint model of the user for the user using the plurality of sets of parameterized speech data included in the updated time window channel;

a speech recognition step for recognizing phonemes corresponding to respective frames in the speech data;

in the time-varying data storing step, further storing phonemes corresponding to the latest parameterized speech data and frame intervals corresponding to the phonemes into the time-varying data storage unit; and in the time window channel construction step, updating the parameterized speech data included in the time window channel based on the phonemes corresponding to the latest parameterized speech data, so that phonemes corresponding to the plurality of sets of parameterized speech data included in the time window channel are evenly distributed;

wherein, in the time window channel construction step, tentatively removing a set of parameterized speech data from the time window channel sequentially in the order of the time labels from old to new, and calculating an equilibrium degree of a character-based phoneme distribution based on all of parameterized speech data remained in the time window channel and the latest parameterized speech data, and if the equilibrium degree is greater than or equal to a predetermined threshold of the equilibrium degree, pushing the latest parameterized speech data into the time window channel; otherwise, restoring the set of parameterized speech data tentatively removed to the time window channel, and then tentatively removing a next set of parameterized speech data from the time window channel, and once again, calculating the equilibrium degree based on all of parameterized speech data remained in the time window channel and the latest parameterized speech data till each set of parameterized speech data included in the time window channel has been tentatively removed or the latest parameterized speech data has been pushed into the time window channel.

9. The dynamic security code speech-based identity authentication method having self-learning function according to claim 8, wherein in the time window channel construction step, comparing the phonemes corresponding to the latest parameterized speech data with phonemes corresponding to an earliest parameterized speech data in the time window channel, and when a matching degree of the phonemes corresponding to the latest parameterized speech data and the phonemes corresponding to the earliest parameterized speech data is greater than or equal to a predetermined matching degree, pushing the latest parameterized speech data into the time window channel, and removing the earliest parameterized speech data from the time window channel.

10. The dynamic security code speech-based identity authentication method having self-learning function according to claim 8, wherein in the model reconstruction step, estimating an updating frequency for updating the speech data of the user stored in the time-varying data storage unit, and if the updating frequency is less than a predetermined frequency, reconstructing the voiceprint model of the user for the user in a model adaptation manner; otherwise, reconstructing the voiceprint model of the user for the user in a direct re-training manner.

11. The dynamic security code speech-based identity authentication method having self-learning, function according to claim 8, wherein, in the model. reconstruction step, estimating an updating frequency for updating the parameterized speech data of the user stored in the time-varying data storage unit, and if the updating frequency is less than a predetermined frequency, reconstructing the voiceprint model of the user for the user in a model adaptation manner; otherwise, reconstructing the voiceprint model of the user for the user in a direct re-training manner.

12. The dynamic security code speech-based identity authentication method having self-learning function according to claim 8, wherein in the parameterization step, performing voice activity detection on the speech data before performing a parameterization processing on the speech data.

13. The dynamic security code speech-based identity authentication method having self-learning function according to claim 8, wherein in the parameterization step, using Mel Frequency Cepstrum Coefficient (MFCC) as a feature parameter, and only saving a zero-order MFCC feature when performing the parameterization processing on the speech data.

14. The dynamic security code speech-based identity authentication method having self-learning function according to claim 8, wherein the identity authentication module calculates the comprehensive confidence of the identity according to a following equation:

$$CL = \frac{1}{1+e^{-(\overline{CL_1}+\alpha \cdot \overline{CL_2})}},$$

wherein CL is the comprehensive confidence of the identity, $\overline{CL_1}$ is a security code content confidence average, $\overline{CL_2}$ is a requester identity speech confidence average, $\alpha$ is an adjusting parameter of the security code content confidence average $\overline{CL_1}$ and the requester identity speech confidence average $\overline{CL_2}$, and $\alpha$ is a real number.

* * * * *